United States Patent

[11] 3,568,051

[72] Inventor Joseph Vild
 Lyndhurst, Ohio
[21] Appl. No. 789,159
[22] Filed Jan. 6, 1969
[45] Patented Mar. 2, 1971
[73] Assignee Republic Steel Corporation
 Cleveland, Ohio

[54] AN EDDY CURRENT DEFECT DETECTOR UTILIZING PLURAL ROTATING SEARCH COILS IN COMBINATION WITH LOGIC CIRCUITRY AND MARKERS
 43 Claims, 6 Drawing Figs.
[52] U.S. Cl. .................................................. 324/37
[51] Int. Cl. .................................................. G01r 33/12
[50] Field of Search ...................................... 324/34, 37, 40; 73/67.5, 67.6, 67.7, 67.8, 67.9

[56] References Cited
UNITED STATES PATENTS
3,281,667 10/1966 Dobbins et al. ............. 324/40
3,437,918 4/1969 Arnelo ....................... 324/37
3,469,182 9/1969 Wycherley et al. .......... 324/37

Primary Examiner—Rudolph V. Rolinec
Assistant Examiner—R. J. Corcoran
Attorneys—Robert P. Wright and Joseph W. Malleck ABSTRACT: In eddy current defect detecting and marking apparatus, a plurality of search coils are mounted for rotation about an axis coincident with the axis of an elongated article being inspected. A plurality of magnets are mounted for rotation with the search coils and positioned to actuate fixed-position switches. Signals from the search coils and from the switches are utilized in logic circuitry to cause actuation of appropriate ones of a plurality of marking devices depending on where circumferentially and longitudinally of the cylindrical article a detected defect or defects lies for physically marking on the article the defect location.

INVENTOR
JOSEPH VILD
BY Watts, Hoffmann,
Fisher & Heinke
ATTORNEYS.

AN EDDY CURRENT DEFECT DETECTOR UTILIZING PLURAL ROTATING SEARCH COILS IN COMBINATION WITH LOGIC CIRCUITRY AND MARKERS

CROSS REFERENCES TO RELATED PATENTS AND APPLICATIONS a. U.S. Pat. No. 2,660,704, issued Nov. 24, 1953 to W. C. Harmon et al. for "Seam Depth Indicator";

b. U.S. Pat. No. RE 26,286, re-issued Oct. 17, 1967 to W. C. Harmon for "Method and Apparatus for Inspecting Workpieces which are Relatively Independent of Probe Motion";

c. U.S. Pat. application Ser. No. 287,987, filed Jun. 14, 1963 now U.S. Pat. No. 3,418,567 "Magnetic Flaw Detector System with Marking Fluid Applicator Operable by Variable Pressure of a Control Fluid," and assigned to the assignee of the present invention;

d. U.S. Pat. application Ser. No. 793,652 filed Jan. 24, 1969 by J. M. Mandula et al. for "Method and Apparatus for Detecting and Marking Defects in Articles," and assigned to the assignee of the present invention; and e. U.S. Pat. application Ser. No. 789,204 filed Jan. 6, 1969 by J. Vild et al. for "Apparatus for Detecting and Marking Defects in Articles," and assigned to the assignee of the present invention.

BACKGROUND OF THE INVENTION

1. Field of the Invention

This invention relates to eddy current defect detecting and marking apparatus, and, more particularly, to such apparatus embodying a plurality of search coils that rotate about an elongated article, such as a bar or pipe, being inspected.

2. Discussion of the Prior Art

The technique of eddy current detection of flaws in metal articles is well known in the prior art. It involves moving a test coil closely over the material being tested. The coil is energized by an oscillator and generates eddy currents in the steel or other metal being tested. When a flow in the metal is encountered, the loading of the search coil is decreased, and, therefore, the output of the oscillator is increased. This variation in oscillator output is detected and utilized to control signalling or classifying apparatus. In some types of apparatus, the article being tested may be classified according to the severity of the defect, while in other types merely the presence of a defect of greater than a predetermined severity will serve to make the article unusable.

When testing cylindrical articles such as rods or pipes, it has heretofore been customary to maintain the search coil or probe in a fixed position and rotate the cylindrical article about its axis as it moves axially past the search coil. This has required the provision of complex mechanical equipment for simultaneously rotating the article being tested about its axis while moving it axially past the search unit. In addition, there remains a possibility that a flaw will be undetected because it does not lie on the helical path traced by the search coil.

It has also been customary to mark a detected defect on the material being tested by means of a single marking device. While this results in a mark on the cylindrical article being tested that is very accurate in its longitudinal or axial position, the mark has no relationship to the circumferential or radial position of the flaw.

Accordingly, it is a general object of the present invention to provide apparatus in which a cylindrical article being tested does not need to be rotated, and which provides increased accuracy over that heretofore attainable in detecting and marking the locations of flaws on an article both as to longitudinal and circumferential position.

SUMMARY OF THE INVENTION

A plurality of search coils are mounted for rotation about an axis coincident with a longitudinal axis of an elongated article being inspected; the article being inspected does not rotate. In the present case, four search coils are utilized, which are mounted 90° apart about the axis of rotation.

An equal number of magnets, corresponding in radial positions to the positions of the search coils, are mounted for rotation with the search coils. The magnets sequentially actuate two fixed-position switches mounted 45° apart, as the magnets rotate past the switches.

Signals from the switches are utilized in logic circuitry to identify from which one of eight equal sectors about the circumference of the article being inspected a defect signal (if any) originates. In the present case, eight fixed-position marking devices are utilized and are respectively mounted over the centers of the eight sectors. Thus, when a marking device is actuated by a defect signal, it accurately marks the axial or longitudinal position of a defect and marks the circumferential position of the defect within ± 22½°.

DESCRIPTION OF A PREFERRED EMBODIMENT

Figure 1:
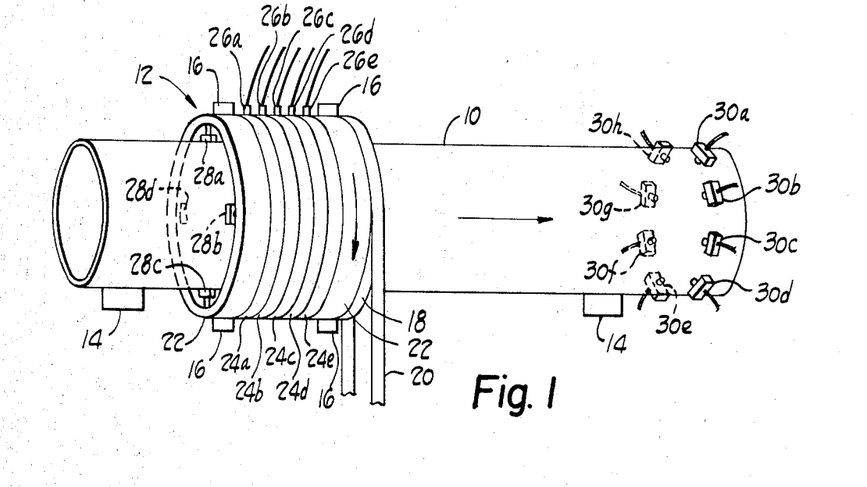
FIG. 1 is a diagrammatic perspective view illustrating an arrangement of rotatable search coils in apparatus embodying the invention.

FIG. 1 shows an elongated article 10, such as a bar or pipe, being inspected for defects by means of an eddy current detection technique, The article 10 is moving in a direction from left to right, as seen in the drawing, and passes through a circular rotatable drum mechanism, indicated generally by the numeral 12. The cylindrical article 10 is supported and moved axially by conventional conveyor mechanism shown diagrammatically at 14. The mechanism 12 is essentially a circular sleeve or drum supported for rotation in conventional bearings 16 and having a pulley 18 at one end. The pulley 18 may be integral with the circular sleeve or may be secured to it by conventional means. The mechanism 12 is rotated by means of a belt 20 engaging the pulley 18 and conventionally driven by means such as a motor (not shown).

The mechanism 12 includes two circular bearing rings 22 which are engaged by the bearings 16, and five slip rings 24$a$—$e$. The slip rings 24 are, of course, insulated from each other and from the bearings rings 22. The slip rings 24$a$—$e$ are respectively contacted by brushed 26$a$—$e$.

Mounted inside the device 12 at 90° radial intervals on the ring 22 are $n$ (in this case, four) search coils 28$a$—$d$. The search coils 28$a$—$d$ may be of the type disclosed in the referenced U.S. Pat. No. 2,660,704. They are spring mounted by conventional means and ride against the outer surface of the article 10 being inspected. One end of the search coil 28$a$ is electrically connected to the slip ring 24$a$, and the search coils 28$b$, $c$, $d$, are similarly respectively connected to the slip rings 24$b$, $c$, $d$. The remaining ends of the search coils 28$a$—$d$ are connected together and to the slip ring 24$e$. Signals from the $n$ search coils 28 are provided through the $n$ slip rings 24 to $n$ signal processing channels and to logic circuitry to be later described and, after processing, are utilized to actuate appropriate ones of eight ($2n$) marking devices 30$a$—$h$ located "downstream" of the rotating drum mechanism 12.

The marking devices 30 are fixed in position, and the signals from the search coils 28$a$—$d$ are delayed in time by a sufficient amount to actuate the marking devices to accurately mark on the article being inspected the axial position of any defect detected. Which of the marking devices is actuated depends on the search coil from which a defect signal originates, as will be later described.

The mechanical and structural details of the apparatus thus far described and shown in FIG. 1 are fully set forth in the referenced application Ser. No. 793,652, which is incorporated herein by reference.

The marking devices 30 may be of the fluid marking type disclosed in the referenced application Ser. No. 287,987, or may be of conventional commercially available type. They need not be fluid marking devices, but may be cutting devices for producing nicks or grooves in the article being inspected.

Figure 2:
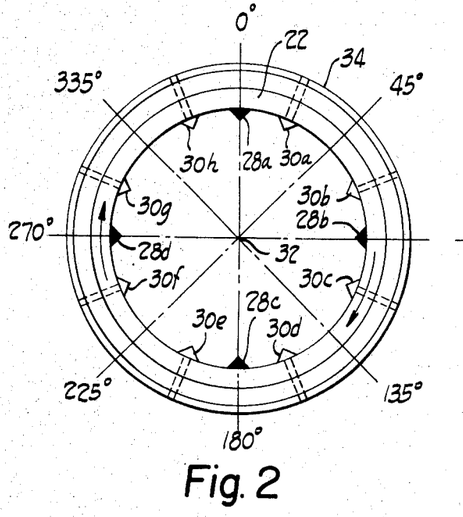
FIG. 2 is a diagrammatic end view showing relative positions of the rotatable search coils and fixed-position marking devices.

FIG. 2 illustrates in diagrammatic form the relative positions of the search coils 28 and the marking devices 30. As shown, the search coils 28 are mounted on the rotatable ring 22, which rotates about an axis 32. The axis 32 is coincident with the longitudinal axis of the cylindrical article 10 being inspected as shown in FIG. 1. The search coils 28 are mounted $x°$, in this case 90°, apart radially about the axis 32. The marking devices 30 are mounted in fixed position on a supporting ring 34. The marking devices 30 are spaced apart radially about the axis 32 by $x/2°$, in this case, 45°, and are offset substantially 22 ½ ($x/4°$) radially from the positions of the search coils 28. Thus, as shown, the search coils 28 divide the circumference of a cylindrical article being tested into four quadrants, and the marking devices 30 divide each of those quadrants in two 45° sectors. Each marking device 30 is mounted substantially in the center of each 45° sector. The radial position of the search coil detecting the defect in the article under inspection determines which of the eight marking devices 30 will be actuated to mark the article in the exact or longitudinal position of the defect and within ± 22½ of its circumferential or radial position. This is accomplished by pulse producing means such as magnets and switches, as shown diagrammatically in FIG. 3.

Figure 3:
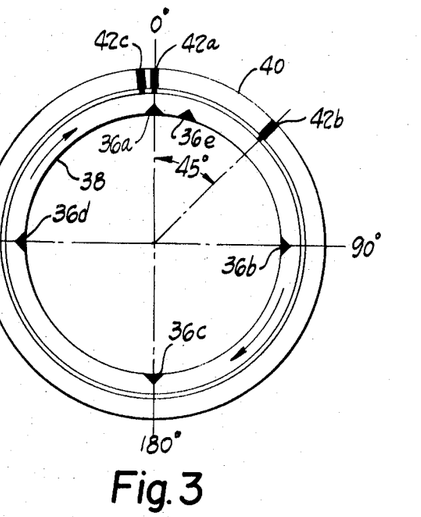
FIG. 3 is a diagrammatic end view showing relative positions of rotatable magnets and fixed-position switches for providing signals to logic circuitry.

As shown, a plurality of five permanent magnets 36a, b, c, d, e are mounted on a ring 38. The ring 38 is affixed to the drum mechanism 12 as, for example, in front of the ring 22 bearing the search coils 28, and rotates with the search coils. The magnet 36a is mounted in the same radial position as the search coil 28a, and magnets 36b, c, d, are respectively mounted in the same positions as the search coils 28b, c, d. A fifth magnet 36e is offset from the magnet 36a by a few degrees toward the magnet 36b.

Mounted on a fixed-position ring 40 are three reed switches 42a, b, c. As shown in FIG. 3, the switch 42a is mounted at approximately 0°, which is angularly the same as the position shown for the magnet 36a, and the search coil 28a. The switch 42b is mounted at an angle of 45° with respect to the switch 42a, and the switch 42c is mounted several degrees in a counterclockwise direction from the switch 42a. The magnets 36a, b, c, d and the switches 42a, b are mounted substantially in the same plane, so that passage of any one of those magnets past either one of those switches causes momentary closure of the switch. The magnet 36e and the switch 42c are mounted in a slightly different plane so that passage of the magnet 36e affects only the switch 42c and neither of the switches 42a, 42b, and passage of the magnets 36a, b, c, d does not affect the switch 42c. The magnet 36e and the switch 42c serve as a reset mechanism for the logic circuitry to be later described.

If it is assumed with reference to FIG. 3 that the ring 38 is rotating in a clockwise direction from the position shown, the switch 42a is first actuated by the magnet 36a, then the switch 42b is actuated by the magnet 36a. After 45 more degrees of rotation, the switch 42a is actuated by the magnet 36d, and then after another 45° rotation the switch 42b is actuated by that same magnet. This process proceeds sequentially with the switch 42a being actuated once for every 90° of rotation of the ring 38, and the switch 42b being actuated once for each 90° of rotation of the ring. The switches 42a, 42b are actuated alternately at 45° rotational intervals. Once during each rotation of the ring 38, the magnet 36e actuates the switch 42c to indicate the completion of a rotational cycle and initiate the start of another cycle. Thus, it is seen that the rotational position of the ring 38 can be determined within 45° if the number of actuations of the switches 42a, b are counted and the sequence in which they are actuated determined.

Figure 4:
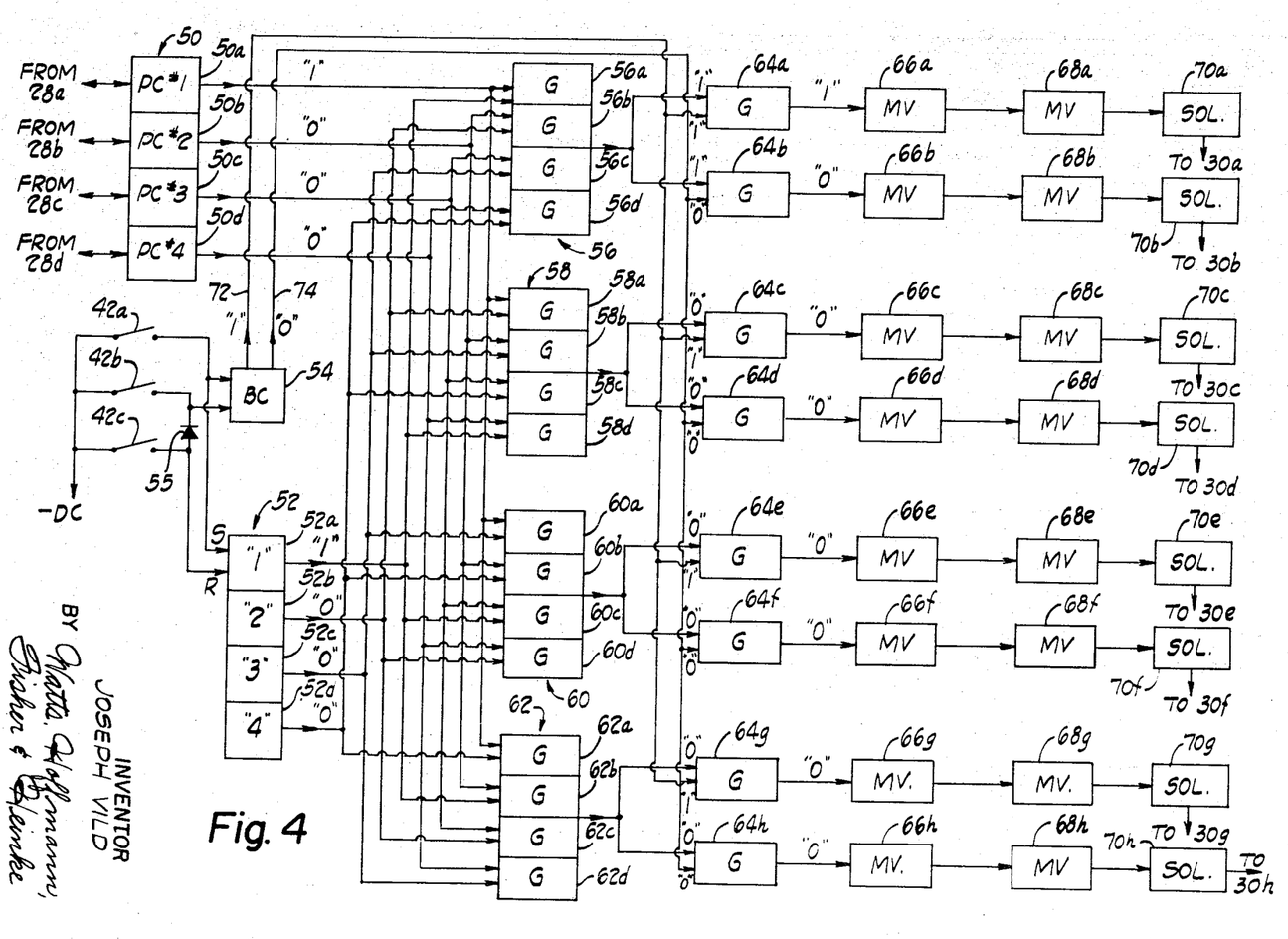
FIG. 4 is a block diagram of logic circuitry embodying the invention.

FIG. 4 is a block diagram of logic circuitry embodying the invention. Pulse signals are provided to the logic circuitry from the outputs of four signal processing channels 50a, b, c, d of a signal processor 50. Inputs of the four signal processing channels are respectively connected to the slip rings 24a, b, c, d (FIG. 1) to transmit oscillations to and receive oscillations from the four search coils 28a, b, c, d. The signal processing channels 50 are described and their functions explained in detail in the referenced Pat. application Ser. No. 789,204. That application is incorporated herein by reference. It is sufficient for a clear understanding of the present application to note that the signal processing channels 50 are energized by an oscillator (not shown) at a so-called "critical frequency" of the metallic object being inspected. This technique is clearly explained in the referenced U.S. Pat. No. RE 26,286.

As explained in the referenced application of Vild et al., when a defect is detected in the material being inspected, the amplitudes of the oscillations coupled to the processing channels 50 from the search coils 28 increases. If a flaw is detected by only one of the search coils, the amplitude of the signals provided to its corresponding processing channel will increase, while the signals provided to the other processing channels will be unaffected in amplitude. Inasmuch as the signals are transmitted to the processing channels through the slip rings 24 and the brushes 26, it is impossible to tell from the signal itself the radial location of its corresponding search coil when the flaw was detected. It is for this reason that the magnets 36, the switches 42 and the logic circuitry about to be described are provided.

As shown in FIG. 4, the reed switch 42a is connected between a −DC supply (not shown) and an input of a conventional ring counter 52. The reed switch 42c is connected between the −DC supply and a reset input of the ring counter 52. As the magnets 36 successively pass the switch 42a and momentarily cause it to close, the counter 52 is actuated in conventional fashion by the resultant pulses, to provide output signals successively from its four sections 52a, b, c, d. When the magnet 36e passes the switch 42c and causes it to close momentarily, the resultant pulse resets the counter 52 to zero slightly before the next pulse is received from the switch 42a. This was explained and is shown diagrammatically in FIG. 3.

Momentary actuation of the switch 42a also provides a pulse signal to one input of a conventional binary counter 54. The counter 54 also receives a pulse signal on a second input each time the switch 42b is actuated. The counter 54 also receives a reset pulse through a diode 55 from the reed switch 42c slightly before the next pulse from the switch 42a. The binary counter 54 thus receives signals alternately from the switches 42a, b, at each 45° increment of rotation of the search coils 28 and magnets 36, which cause it to change state.

As the switch 42a is successively actuated by the magnets 36a, b, c, d, the ring counter 52 serves to provide output signals successively on its four output leads that indicate the positions of the search coils 28 with respect to in which of the 90° sectors shown in FIGS. 2 and 3 they are located. The binary counter 54, which changes state each time the search coils and magnets rotate 45°, serves to provide signals that indicate within which half or 45° sector of each quadrant the search coils are located.

Output signals from the signal processing channels 50 are applied to four ($n$) channel selectors 56, 58, 60, 62. Each channel selector 56—62 comprises four coincidence gates, which are respectively designated by suffixes a, b, c, d. Each of the coincidence gates has two inputs, one of each receives a signal from the signal processor 50 and the other of which receives a signal from the ring counter 52. The input signals to each gate must bear particular polarity relationships, as will be explained later, in order to provide an output signal from the gate. The output signals from all four of the gates in each of the channel selectors 56, 58, 60, 62 are combined in each selector to provide one output signal from each selector.

The output of the channel selector 56 is connected to the input of each of two marker selectors 64a, b. Similarly, the output of the channel selector 58 is connected to an input of each of two marker selectors 64c, d; the output of the channel selector 60 is connected to an input of marker selectors 64e, f; and the output of the channel selector 62 is connected to an input of each of two marker selectors 64g, h. The marker selectors 64 are also coincidence gates. Each has a second input which is connected to receive a signal from the binary counter 54. Specifically, the second inputs of the marker selectors 64a, c, e, g are connected to receive a signal of one polarity from the binary counter 54, and the marker selectors 64b, d, f, h are connected to receive a signal of opposite polarity. The result is that only one of the marker selectors 64 will provide an output signal at any one time, and the particular marker selector that is capable of producing an output signal is dependent on the rotational positions (within 45°) of the search coils.

Output signals from the marker selectors 64a—h are respectively provided as input signals to an equal number of one-shot multivibrators 66a—h. The multivibrators 66 serve to provide time delays to permit a detected defect to progress from the axial position of the search coils 28 to the axial position of the marking devices 30 (FIG. 1). The width of the pulses produced by each multivibrator 66 is, of course, adjustable and is dependent upon the axial speed of travel of the article 10 being inspected. The output signals of the multivibrators 66b—h are respectively provided to second one-shot or "dwell" multivibrators 68a—h. The purpose of the multivibrators 68 is to energize the marking devices 30 for predetermined lengths of time to make visible marks on the article being inspected. The dwell multivibrators 68 are triggered by the trailing edges of "dwell" pulses produced by the one-shot multivibrators 66.

OUtput signals of the "dwell" multivibrators 68a—h are respectively provided to actuate solenoids 70a—h. The solenoids 70a—h respectively control the operation of the markers 30a—h shown in FIG. 1.

The circuitry shown in FIG. 4 is binary in operation. In other words, the amplitudes of the various signals provided to and from the gates are of no particular importance; it is their presence or absence that affects the operation of the components involved, as is well known in the computer art. It is pointed out that the signals provided to the channel selectors 56, 58, 60, 62 from the signal processing channels 50 are substantially of equal amplitude, which amplitude bears no relation to the severity or amplitude of a defect detected by the search coils. As is shown in the referenced patent application of Vild et al., the output signals of the processing channels 50 are provided from one-shot multivibrators, and hence are of equal amplitudes and durations.

The operation of the circuitry shown in FIG. 4 will be described by using several specific examples. Assumed conditions in the first example are that the search coils 28 and the magnets 36 are in the positions shown in FIGS. 2 and 3, and that a defect is being detected by the search coil 28a. This latter condition means that there is an output signal provided from the signal processing channel 50a. For purposes of explanation, the presence of a signal is denoted as a 1 condition and the absence of a signal is denoted as a 0 condition.

In the example chosen, the processing channel 50a is providing a 1 output signal as noted, and the other processing channels 50b, c, d, are providing 0 output signals. Also, the ring counter 52 is providing a 1 output signal from its section 52a and 0 output signals from its other sections. The binary counter 54 is providing a 1 output signal on a lead 72 and a 0 output signal on a lead 74. Both of the signals from the counters 52, 54 are caused by momentary actuation of the switch 42a by the passage of the magnet 36a.

As shown, the channel selector gates 56a, 58a, 60a, 62a are all connected to receive the output signal from the processing channel 50a. Similarly, all of the b channel selector gates receive input signals from the output of the processing channel 50b; the c channel selector gates receive input signals from the processing channel 50c; and the d channel selector gates receive input signals from the processing channel 50d. The selector gates 56a, 58d, 60c, and 62b receive signals from the first section 52a of the ring counter 52. Similarly, the channel selector gates 56b, 58a, 60a and 62c receive signals from the section 52b of the ring counter. The selector gates 56c, 58b, 60a and 62d receive signals from the section 52c of the counter, and the gates 56d, 58c, 60b and 62a receive signals from the counter section 52d. Thus, under the assumed conditions, it is apparent that only the channel selector gate 56a will have two 1 input signals. Therefore, it is the only selector gate that will provide a 1 output signal. None of the other gates will have coincident 1 input signals, and hence all will provide 0 output signals. The 1 output signal from the channel selector 56 is provided as one input to each of the marker selector gauges 64a, b. The output signals provided by the other channel selectors 58, 60, 62 to their respective marker selector gates are all 0.

A second input of each of the four marker selectors 64a, c, e.g., is connected to the lead 72 from the binary counter 54. A second input of each of the other four marker selectors 64b, d, f, h is connected to the lead 74 from the binary counter 54. It will be recalled that the switch 42a has been closed once to cause the binary counter to provide a 1 signal on its lead 72. Therefore is is apparent that the only marker selector 64 that will have two 1 input signals is the selector 64a. This will cause the marker selector 64a to provide an output signal to serially energize the multivibrators 66a, 68a and the solenoid 70a to cause the marker 30a to mark the object being inspected at the center of the O—45° sector shown in FIG. 2.

If a defect signal had not been detected by the search coil 28 a until it had rotated clockwise through 45° (FIG. 2), the switch 42b would have been actuated by the magnet 36a at the 45° point to reverse the output signal conditions of the binary counter 54. In that case, the marker selector 64b would have provided a 1 output signal to energize the multivibrators 66b, 68b and the solenoid 70b. That would actuate the marking device 30b to mark the article being inspected in its 45—90° sector.

As a further example, consider that a defect is detected by the search coil 28c when the coils are in the positions shown in FIG. 2. In that case, each of the channel selector gates 56c, 58c, 60c, 62c will receive a 1 input signal from the signal processing channel 50c. However, the only one of those four selector gates that will also receive a 1 input signal from the section 52a of the ring counter 52 is the marker selector gate 60c. Thus, the marker selector 64e provides a 1 output signal to trigger the multivibrators 66e, 68e in series. The solenoid 70e will then be energized to actuate the marking device 30e and place a mark on the article being inspected which is substantially diametrically opposed to the position of the mark when the search coil 28a detected a defect.

It is possible to give an example for a defect detected by any of the search coils in any of the eight sectors of the cylindrical article being inspected. However, it is believed to be sufficient for a clear understanding of the invention if one further and final example is given. Therefore, assume that a defect is detected by the search coil 28a when it has rotated approximately 90° in a clockwise direction about the object being inspected from the position shown in FIG. 2. In the case, the magnet 36a will have actuated the switches 42a, b, and the magnet 36d will have just actuated the switch 42a. This means that the binary counter 54 will again be providing a 1 output signal on its lead 72 and the section 52b of the ring counter 52 will be providing a 1 output signal.

The 1 output signal from the counter section 52b is provided to the channel selector gates 56b, 58a, 60d and 62c. Of those four channel selector gates, only the gate 58a will be receiving two 1 input signals. All other channel selector gates will be receiving input signals of opposite polarities or two 0 signals. It follows then that an output signal will be provided only from the channel selector 58. That signal is provided to the marker selectors 64c, d. The marker selector 64c is receiving a 1 input signal on the lead 72 from the binary counter 54, and the selector 64d is receiving a 0 input signal on the lead 74 from the counter. Therefore, only the marker selector 64c will provide a 1 output signal ro actuate the marker solenoid 70c to mark the article being inspected at the position shown by the marking device 30c.

It is pointed out that when the apparatus is first energized, the states of the binary counter 54 and the ring counter 52 are uncontrolled. Thus, virtually any combinations of search coil position information may be present in the system. This information, generally, is incorrect and would be correct only by coincidence. That combination exists, however, only until the system has been reset during the first revolution of the drum mechanism 12. When the magnet 36e passes the switch 42c, it actuates that switch to provide a reset voltage pulse to both the ring counter 52 and binary counter 54. Thus, the system is reset to a 0 condition before the magnet 36a actuates the switch 42a to set the output of the binary counter 54 to a 1 on its lead 72 and the output of the ring counter section 52a to 1.

It is apparent to one skilled in the art that the coincidence gates of the channel selectors 56, 58, 60, 62 and the marker selectors 64 may take many forms, as to their specific logic components and arrangements. For example, the channel selectors 56, 58, 60, 62 may each comprise four conventional AND gates, the outputs of which are provided to four inputs of an OR gate. The outputs of the four OR gates would then be provided to the marker selectors 64, which may also be conventional AND gates. Such an arrangement was contemplated in the example of various circuit conditions and signals previously given with reference to FIG. 4.

Figure 5:
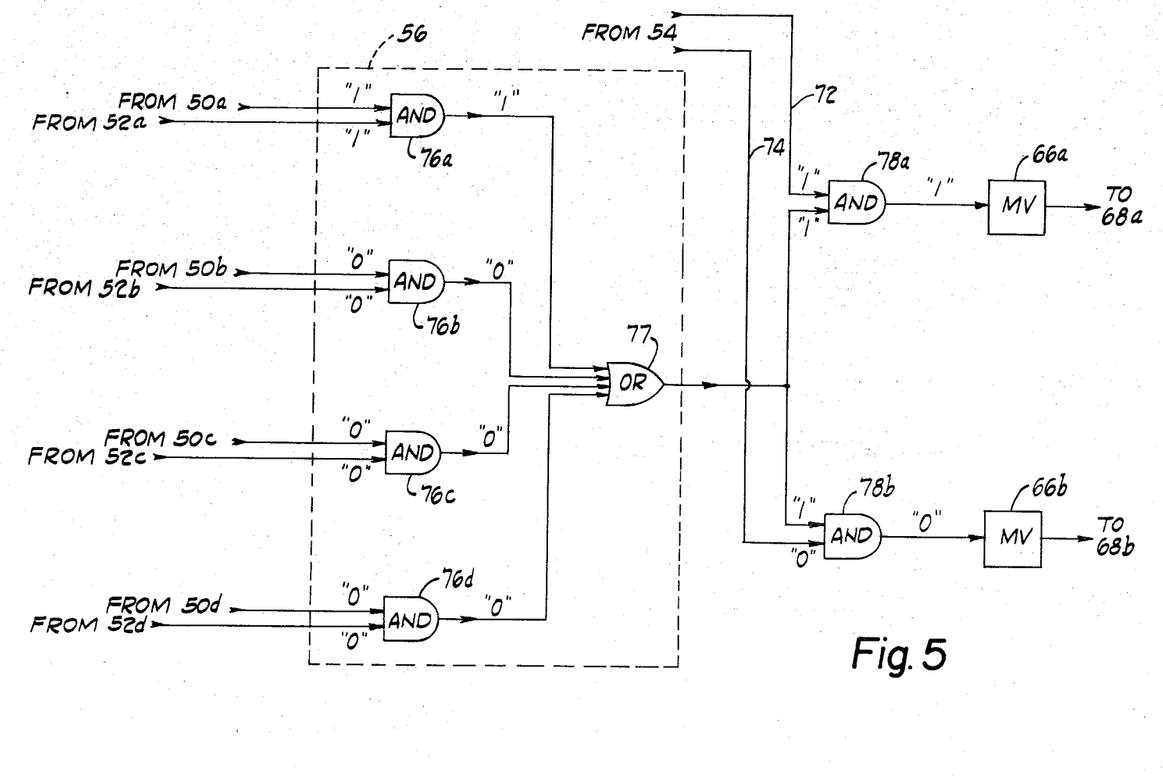
FIG. 5 is a logic diagram of a portion of the circuitry shown in block form in FIG. 4.

FIG. 5 is a logic diagram of one of the channel selectors 56, 58, 60, 62, specifically the channel selector 56 and the two marker selectors supplied by the output of that channel selector. It is again pointed out that the channel selectors 56, 58, 60, 62 are identical in construction and function, and differ only as to their input and output connections.

As shown in FIG. 5, the channel selector 56 comprises four AND gates 76a, b, c, d. The outputs of the AND gates 76 are respectively connected to four inputs of an OR gate 77. The AND gates 76a, b, c, d, respectively, each have one input connected to receive signals from the signal processing channels 50a, b, c, d. The AND gates 76a, b, c, d, also have second inputs which are respectively connected to receive signals from the ring counter sections 52a, b, c, d.

The output of the OR gate 77 is connected to one input of each of two AND gates 78a, b. The AND gates 78a, b correspond to the channel selectors 64a, b, shown in FIG. 4. The AND gate 78a has a second input, which is connected to the lead 72 from the binary counter 54 (FIG. 4), and the AND gate 78b has a second input connected to the lead 74 from the binary counter 54. The outputs of the AND gates 78a, b, are respectively connected to the inputs of the multivibrators 66a, b previously discussed.

In the first example given with reference to FIG. 4, it was assumed that the search coils 28 and the magnets 36 are in the positions shown in FIGS. 2 and 3, and that a defect is being detected by the search coil 28a. Under those assumed conditions, the signal processing channel 50a is providing a 1 output signal; the switch 42a has been momentarily closed by the magnet 36a to cause a 1 output signal to appear on the lead 72 from the binary counter 54, and to cause a 1 output signal to be provided from the first section 52a of the ring counter 52.

The signal processing channels 50b, c, d are all providing 0 output signals, as are the ring counter sections 52b, c, d. Similarly, a 0 signal appears on the lead 74 from the binary counter 54. Under these assumed conditions, only the AND gate 76a shown in FIG. 5 receives two 1 input signals and produces a 1 output signal, which is supplied to the AND gates 78a, b, through the OR gate 77. The lead 72 is supplying a 1 input signal to the AND gate 78a, which in turn provides a 1 output signal to actuate the multivibrator 66a. This causes the marking device 30a to be actuated to mark the article being inspected in its first 45° sector. At that time, the lead 74 is providing a 0 signal to the AND gate 78b so that AND gate provides a 0 output signal, which does not actuate the multivibrator 66b.

If now the search coils 28 and magnets 36 rotate in a clockwise direction 45° from their positions shown in FIGS. 2 and 3, the switch 42b will be momentarily actuated by the magnet 36a to cause the binary counter 54 to change state. Thus, a 1 signal will be provided on the lead 74, and a 0 signal will be provided on the lead 72. This will cause the AND gate 78a to produce a 0 output signal and the AND gate 78b to produce a 1 output signal. This causes the multivibrator 66b to be energized rather than the multivibrator 66a, which eventually causes the marking device 30b to be actuated to place a mark on the article being inspected in the second 45° sector of the article.

Figure 6:
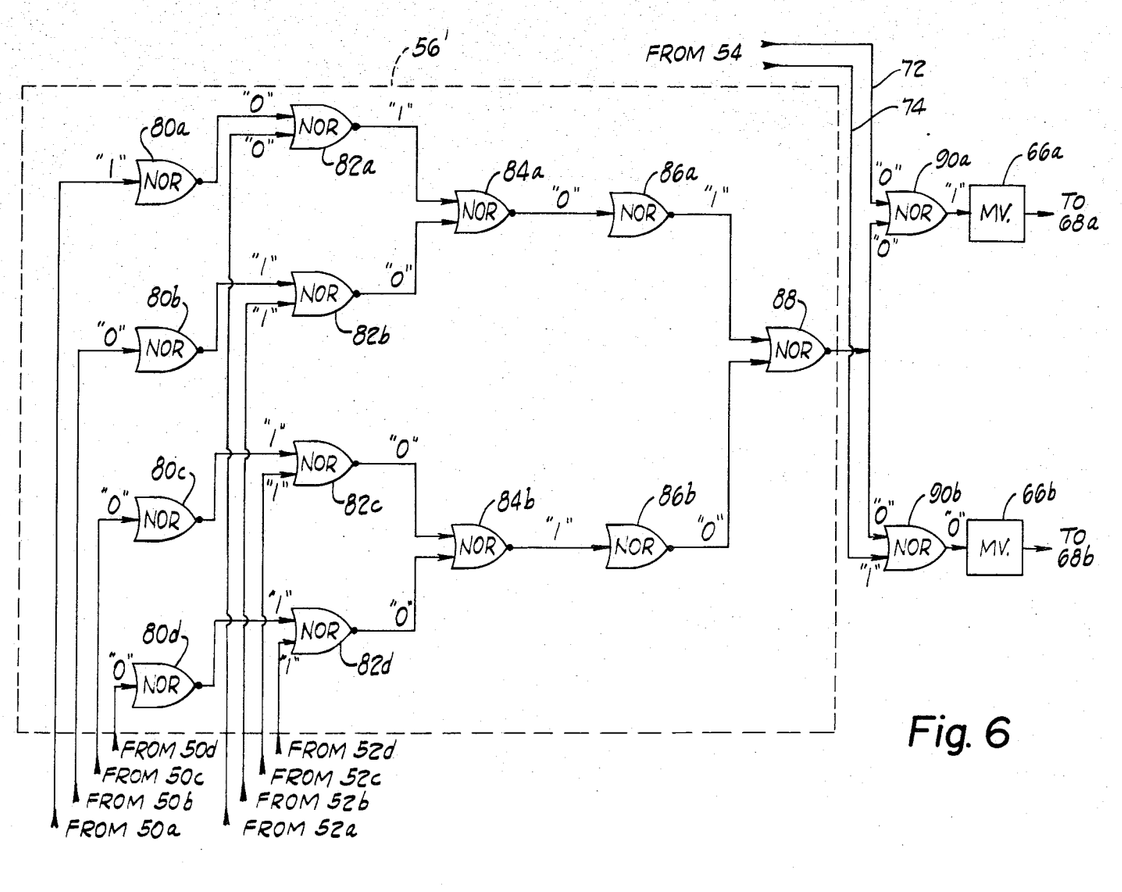
FIG. 6 is a logic diagram similar to FIG. 5, but showing a modified form of logic.

FIG. 6 shows a modified form of logic for the channel selectors and marker selectors. Again, as in the case of FIG. 5, only one channel selector (designated 56') is shown along with its two corresponding two marker selectors. The logic shown in FIG. 6 differs from that shown in FIG. 5 primarily in that NOR logic elements are used rather than AND logic elements. This necessitates a reversal in polarity of the signals provided to the channel selectors by the ring counter 52 and the binary counter 54. In other words, in the example shown in FIG. 4, the lead 72 from the binary counter 74 would have a 0 signal thereon and the lead 74 would have a 1 signal. In the ring counter 52, the section 52a would be providing a 0 signal and the sections 52b, c, d would be providing 1 signals. The various sections of the signal processing channels 50 would still provide 1 signals when defects are detected and 0 signals when no defects are detected. This polarity-reversal practice is well known to those skilled in the computer art, inasmuch as such counters normally have two outputs that provide signals of opposite polarity, and no further explanation is believed necessary.

As previously noted, all of the logic elements in the circuitry shown in FIG. 6 are NOR gates. Such a gate is, by definition, one in which all input signals thereto must be 0 to provide a 1 output signal, and, if any one or more of the input signals are 1's, the output signal will be 0. If all of its inputs are connected together, a NOR gate acts as an inverter and is so used a number of times in the present application.

The principal advantage of such NOR logic circuitry over the AND circuitry shown in FIG. 5 is that it is readily available commercially in standard packages. For example, such packages are available from Square D Company, Milwaukee, Wisconsin and are known as NORPAK solid state logic controls. Functionally, the circuitry shown in FIG. 6 is identical to that shown in FIG. 5.

As shown in FIG. 6, signals from the processing channels 50a, b, c, d are respectively provided to the inputs of NOR gates 80a, b, c, d. The NOR gates 80 are connected as inverters. The outputs of the NOR gates 80a, b, c, d are connected respectively to one input of four corresponding NOR gates 82a, b, c, d. Second inputs of the NOR gates 82a, b, c, d are respectively connected to receive signals from the ring counter sections 52a, b, c, d. Outputs of the NOR gates 82a, b are connected to inputs of a NOR gate 84a, and outputs of the NOR gates 82c, d are similarly connected to a NOR gate 84b. Output signals of the NOR gates 84a, b are respectively inverted by NOR GATES 86a, b and provided to two inputs of a NOR gate 88.

The output of the channel selector 56' is taken from the NOR gate 88 and supplied as an input to each of two NOR gates 90a, b. The NOR gates 90a, b correspond to the channel selectors 64a, b shown in FIG. 4. A second input to the is gate 90a is connected to the lead 72 from the binary counter 54, and a second input of the NOR gate 90b is connected to the lead 74 from the binary counter. Outputs of the NOR gates 90a, b are respectively supplied as inputs to the multivibrators 66a, b previously described.

Assuming that the positions of the search coils 28 and the magnets 36 are as shown in FIGS. 2 and 3 and that the search coil 28a is detecting a flaw, a 1 signal will be supplied to the gate 80a and 0 signals will be supplied to the gates 80b, c, d. These signals are inverted by the gates 80 so that a 0 signal is supplied to the NOR gate 82a, and 1 signals are supplied to the NOR gates 82b, c, d. The second input of the NOR gate 82a is supplied with a 0 signal from the ring counter 52a, which causes that gate to produce a 1 output. The second inputs of the NOR gates 82b, c, d, are supplied with 1 signals from the ring counter sections 52b, c, d. The gates 82b, c, d thus provide 0 output signals.

The 1 and 0 signals supplied to the NOR gate 84a cause that gate to produce a 0 output signal, while the two 0 signals supplied to the NOR gate 84b cause that gate to produce a 1 output signal. The signals from the gates 84a, b are inverted by the gates 86a, b and provided to the two inputs of the NOR gate 88. The 1 and 0 input signals to the NOR gate 88 cause it to produce a 0 output signal.

The 0 output signal provided from the NOR gate 88 is supplied to the two NOR gates 90a, b. The NOR gate 90a is simultaneously receiving a 0 signal on the lead 72 from the binary counter 54, which causes that gate to produce a 1 output signal. This signal is provided to the input of the multivibrator 65a to provide a mark on the article being inspected in the middle of its first 45° sector.

The NOR gate 90b is receiving a 0 input signal from the gate 88 and a 1 input signal on the lead 74 from the binary counter 54. This causes the gate 90b to provide a 0 output signal, which does not trigger its associated multivibrator 66b.

If now the search coils 28 and the magnets 36 rotate clockwise 45° from the position shown in FIGS. 2 and 3, the switch 42b will be momentarily closed. This causes the polarities of the signals on the leads 72, 74 from the binary counter 54 to reverse. Thus, the NOR gate 90a will provide a 0 output signal, whereas the NOR gate 90b will provide a 1 output signal. This causes the marking device 30b to be actuated to place the mark on the article in the second 45° sector.

It is apparent that the same examples used in connection with the description referring to FIG. 4 may be applied to the specific logic circuitry shown in FIGS. 5 and 6. However, this is believed to be unnecessary for a clear understanding of the invention.

It is now seen that the invention achieves the general objective set forth. Apparatus embodying the invention visibly marks defects detected in a cylindrical article being inspected, with the axial positions of such defects being marked extremely accurately, and with the circumferential or radial positions of the defects being marked within 22½° sector of the article. It is also pointed out that the invention is not limited to the use of any particular number of search coils or any particular number of marking devices. If increased circumferential marking accuracy is desired, the number of search coils and marking devices may be increased as necessary to provide the desired accuracy. Of course, the numbers of magnets, switches and channels of logic circuitry will have to be increased correspondingly.

Although two embodiments of the invention have been shown and described, it is apparent many modifications may be made therein without departing from the spirit and scope of the invention.

I claim:

1. In eddy current defect detecting and marking apparatus for inspecting an elongated article having a longitudinal axis and having rotatable search coils where $n$ is any integral number greater than 1 mounted for rotation about an axis substantially coincident with said longitudinal axis and spaced radially about said axes, and having $n$ signal processing channels respectively connected to said search coils for respectively providing defect indicating signals in response to a defect of greater than a predetermined severity being detected by a corresponding search coil, the improvement comprising:

a. of $m$ marking devices fixedly mounted and spaced apart radially about said axes, $m$ being an integral multiple of $n$;

b. of $n$ logic channels connected to receive said defect indicating signals from said $n$ signal processing channels and in response thereto respectively provide marker actuating signals to said $m$ marking devices when said logic channels are enabled; and c. position indicating means operatively connected to said rotatable search coils for providing enabling signals to successively enable said logic channels as said search coils rotate.

2. In eddy current defect detecting and marking apparatus for inspecting an elongated article having a longitudinal axis and having $n$ rotatable search coils where $n$ is any integral number greater than 1 mounted for rotation about an axis substantially coincident with said longitudinal axis and equally spaced radially about said axes, and having $n$ signal processing channels respectively connected to said search coils for respectively providing defect indicating signals in response to a defect of greater than a predetermined severity being detected by a corresponding search coil, the improvement comprising:

a. $m$ marking devices fixedly mounted and equally spaced apart radially about said axes, $m$ being an integral multiple of $n$;

b. $n$ first logic channels all connected to receive said defect indicating signals from said signal processing channels and in response thereto respectively provide channel selector output signals when said defecting indicating signals occur when said first logic channels are enabled;

c. $m$ second logic channels connected as $n$ separate groups with $m/n$ second channels in each group, to respectively receive said channel selector output signals from said $n$ first logic channels and in response thereto respectively provide marker actuating signals to said $m$ marking devices when said second logic channels are enabled; and d. position indicating means operatively connected to said rotatable search coils for providing enabling signals to successively enable said first logic channels and successively enable said $m/n$ second logic channels of each said group as said search coils rotate.

3. The improvement of claim 1, wherein said position indicating means includes:

i. pulse producing means for providing at least one pulse signal each time said search coils incrementally rotate through $360/m°$, and ii. counting means connected to receive consecutive pulse signals from said pulse producing means and provide said enabling signals to successively enable said logic channels.

4. The improvement of claim 2, wherein said position indicating means includes:

i. first pulse producing means for providing a first pulse signal each time said search coils incrementally rotate through $360/n°$;

ii. second pulse producing means for providing a second pulse signal each time said search coils incrementally rotate through $360/m°$ beyond each point where said first pulse signal is produced;

iii. first counting means connected to receive consecutive first pulse signals from said first pulse producing means and successively enable said first logic channels as said search coils rotate; and iv. second counting means connected to receive consecutive first pulse signals and consecutive second pulse signals from said first and second pulse producing means and successively enable said $m/n$ second logic channels of each said group as said search coils rotate.

5. The improvement of claim 4, wherein said first counting means is a digital counter.

6. The improvement of claim 3, wherein said pulse producing means includes a plurality of switches fixedly positioned with respect to said search coils, and switch actuating means mounted for rotation with said search coils for actuating said switches.

7. The improvement of claim 6, wherein said switches are reed switches, and said actuating means are magnets.

8. The improvement of claim 1, wherein $m$ equals $2n$.

9. The improvement of claim 8, wherein $m$ equals 8 and $n$ equals 4.

10. In eddy current defect detecting and marking apparatus for inspecting an elongated article having a longitudinal axis and having $n$ rotatable search coils where $n$ is any integral number greater than 1 mounted for rotation about an axis substantially coincident with said longitudinal axis and equally spaced radially about said axes, and having $n$ signal processing channels respectively connected to said search coils for respectively providing defect indicating signals in response to a defect of greater than a predetermined severity being detected by a corresponding search coil, the improvement comprising:

a. $m$ marking devices fixedly mounted and equally spaced apart radially about said axes, $m$ being an integral multiple of $n$;
  b. $n$ first logic channels all connected to receive said defect indicating signals from said signal processing channels and in response thereto respectively provide channel selector output signals when said defect indicating signals occur when said first logic channels are enabled;
  c. $m$ second logic channels connected as $n$ separate groups with $m/n$ second channels in each group, to respectively receive said channel selector output signals from said $n$ first logic channels and in response thereto respectively provide marker actuating signals to said $m$ marking devices when said second logic channels are enabled;
  d. position indicating means operatively connected to said rotatable search coils for providing enabling signals to successively enable said first logic channels and successively enable said $m/n$ second logic channels of each said group as said search coils rotate, said position indicating means including
    i. first pulse producing means for providing a first pulse signal each time said search coils incrementally rotate through $360/n°$;
    ii. second pulse producing means for providing a second pulse signal each time said search coils incrementally rotate through $360/m°$ beyond each point where said first pulse signal is produced;
    iii. first counting means connected to receive consecutive first pulse signals from said first pulse producing means and successively enable said first logic channels as said search coils rotate;
    iv. second counting means connected to receive consecutive first pulse signals and consecutive second pulse signals from said first and second pulse producing means and successively enable said $m/n$ second logic channels of each said group as said search coils rotate; and
  e. third pulse producing means for providing a reset pulse to said counting means once during each 360° rotation of said search coils.

11. In eddy current defect detecting and marking apparatus for inspecting an elongated article having a longitudinal axis and having $n$ rotatable search coils where $n$ any integral number greater than 1 mounted for rotation about an axis substantially coincident with said longitudinal axis and equally spaced radially about said axes, and having $n$ signal processing channels respectively connected to said search coils for respectively providing defect indicating signals in response to a defect of greater than a predetermined severity being detected by a corresponding search coil, the improvement comprising:

a. $m$ marking devices fixedly mounted and equally spaced apart radially about said axes, $m$ being an integral multiple of $n$;
  b. $n$ first logic channels all connected to receive said defect indicating signals from said signal processing channels and in response thereto respectively provide channel selector output signals when said defect indicating signals occur when said first logic channels are enabled;
  c. $m$ second logic channels connected as $n$ separate groups with $m/n$ second channels in each group, to respectively receive said channel selector output signals from said $n$ first logic channels and in response thereto respectively provide marker actuating signals to said $m$ marking devices when said second logic channels are enabled;
  d. position indicating means operatively connected to said rotatable search coils for providing enabling signals to successively enable said first logic channels and successively enable said $m/n$ second logic channels of each said group as said search coils rotate, said position indicating means including:
    i. pulse producing means for providing at least one pulse signal each time said search coils incrementally rotate through $360/n°$; and
    ii. counting means connected to receive consecutive pulse signals from said pulse producing means and provide said enabling signals to successively enable said logic channels.

12. The improvement of claim 4, wherein said first and second pulse producing means includes a plurality of switches fixedly positioned with respect to said search coils, and switch actuating means mounted for rotation with said search coils for actuating said switches.

13. The improvement of claim 5, wherein said first and second pulse producing means includes a plurality of switches fixedly positioned with respect to said search coils, and switch actuating means mounted for rotation with said search coils for actuating said switches.

14. The improvement of claim 12, wherein said switches are reed switches, and said actuating means are magnets.

15. The improvement of claim 13, wherein said switches are reed switches, and said actuating means are magnets.

16. The improvements of claim 5, further including third pulse producing means for providing a reset pulse to said counting means once during each 360° rotation of said search coils.

17. The improvement of claim 12, further including third pulse producing means for providing a reset pulse to said counting means once during each 360° rotation of said search coils.

18. The improvement of claim 13, further including third pulse producing means for providing a reset pulse to said counting means once during each 360° rotation of said search coils.

19. The improvement of claim 16, wherein said switches are reed switches, and said actuating means are magnets.

20. The improvement of claim 17, wherein said switches are reed switches, and said actuating means are magnets.

21. In eddy current defect detecting and marking apparatus for inspecting an elongated article having a longitudinal axis and having $n$ rotatable search coils where $n$ is any integral number greater than 1 mounted for rotation about an axis substantially coincident with said longitudinal axis and equally spaced radially about said axes, and having $n$ signal processing channels respectively connected to said search coils for respectively providing defect indicating signals in response to a defect of greater than a predetermined severity being detected by a corresponding search coil, the improvement comprising:

a. $m$ marking devices fixedly mounted and equally spaced apart radially about said axes, $m$ being an integral multiple of $n$;
  b. $n$ first logic channels all connected to receive said defect indicating signals from said signal processing channels and in response thereto respectively provide channel selector output signals when said defect indicating signals occur when said first logic channels are enabled;

c. $m$ second logic channels connected as $n$ separate groups with $m/n$ second channels in each group, to respectively receive said channel selector output signals from said $n$ first logic channels and in response thereto respectively provide marker actuating signals to said $m$ marking devices when said second logic channels are enabled;

d. position indicating means operatively connected to said rotatable search coils for providing enabling signals to successively enable said first logic channels and successively enable said $m/n$ second logic channels of each said group as said search coils rotate, said position indicating means including:
  i. first pulse producing means including at least one reed switch and at least one actuating magnet for providing a first pulse signal each time said search coils incrementally rotate through $360/n°$.
  ii. second pulse producing means including at least one reed switch and at least one actuating magnet for providing a second pulse signal each time said search coils incrementally rotate through $360/m°$ *beyond each point where said first pulse signal is produced,*
  iii. first counting means comprising a digital counter connected to receive consecutive first pulse signals from said first pulse producing means and successively enable said first logic channels as said search coils rotate;
  iv. second counting means connected to receive consecutive first pulse signals and consecutive second pulse signals from said first and second pulse producing means and successively enable said $m/n$ second logic channels of each said group as said search coils rotate; and e. third pulse producing means for providing a reset pulse to said counting means once during each $360°$ rotation of said search coils.

22. In eddy current defect detecting and marking apparatus for inspecting an elongated article having a longitudinal axis and having $n$ rotatable search coils where $m$ is any integral number greater than 1 mounted for rotation about an axis substantially coincident with said longitudinal axis and equally spaced radially about said axes, and having $n$ processing channels respectively connected to said search coils for respectively providing defect indicating signals in response to a defect of greater than a predetermined severity being detected by a corresponding search coil, the improvement comprising:

a. $2n$ marking devices fixedly mounted and equally spaced apart radially about said axes;

b. $n$ first logic channels all connected to receive said defect indicating signals from said signal processing channels and in response thereto respectively provide channel selector output signals when said defect indicating signals occur when said first logic channels are enabled c. $2n$ second logic channels connected as $n$ separate groups with two second channels in each group, to respectively receive said channel selector output signals from said $n$ first logic channels and in response thereto respectively provide marker actuating signals to said $2n$ marking devices when said second logic channels are enabled; and d. position indicating means operatively connected to said rotatable search coils for providing enabling signals to successively enable said first logic channels and successively enable said two second logic channels of each said group as said search coils rotate.

23. In eddy current defect detecting and marking apparatus for inspecting an elongated article having a longitudinal axis and having $n$ rotatable search coils where $n$ is any integral number greater than 1 mounted for rotation about an axis substantially coincident with said longitudinal axis and equally spaced radially about said axes, and having $n$ signal processing channels respectively connected to said search coils for respectively providing defect indicating signals in response to a defect of greater than a predetermined severity being detected by a corresponding search coil, the improvement comprising:

a. $2n$ marking devices fixedly mounted and equally spaced apart radially about said axes;

b. $2n$ logic channels connected to receive said defect indicating signals from said $n$ signal processing channels and in response thereto respectively provide marker actuating signals to said $2n$ marking devices when said logic channels are enabled; and c. position indicating means operatively connected to said rotatable search coils for providing enabling signals to successively enable said logic channels as said search coils rotate, said position indicating means including:
  i. pulse producing means for providing at least one pulse signal each time said search coils incrementally rotate through $180/n°$; *and*
  ii. counting means connected to receive consecutive pulse signals from said pulse producing means and provide said enabling signals to successively enable said logic channels.

24. In eddy current defect detecting and marking apparatus for inspecting an elongated article having a longitudinal axis and having $n$ rotatable search coils where $n$ is any integral number greater than 1 mounted for rotation about an axis substantially coincident with said longitudinal axis and equally spaced radially about said axis, and having $n$ signal processing channels respectively connected to said search coils for respectively providing defect indicating signals in response to a defect of greater than a predetermined severity being detected by a corresponding search coil, the improvement comprising:

a. $2n$ marking devices fixedly mounted and equally spaced apart radially about said axes;

b. $n$ first logic channels all connected to receive said defect indicating signals from said signal processing channels and in response thereto respectively provide channel selector output signals when said defect indicating signals occur when said first logic channels are enabled;

c. $n$ second logic channels connected as $n$ separate groups with two second channels in each group, to respectively receive said channel selector output signals from said $n$ first logic channels and in response thereto respectively provided marker actuating signals to said $n$ marking devices when said second logic channels are enabled; and d. position indicating means operatively connected to said rotatable search coils for providing enabling signals to successively enable said first logic channels and successively enable said two second logic channels of each said group as said search coils rotate; said position indicating means including:
  i. first pulse producing means for providing a first pulse signal each time said search coils incrementally rotate through $360/n°$,
  ii. second pulse producing means for providing a second pulse signal each time said search coils incrementally rotate through $180/n°$ *beyond each point where said first pulse signal is produced;*
  iii. first counting means connected to receive consecutive first pulse signals from said first pulse producing means and successively enable said first logic channels as said search coils rotate; and
  iv. second counting means connected to receive consecutive first pulse signals and consecutive second pulse signals from said first and second pulse producing means and successively enable said two second logic channels of each said group as said search coils rotate.

25. The improvement of claim 6, wherein $m$ equals $2n$.
26. The improvement of claim 12, wherein $m$ equals $2n$.
27. The improvement of claim 13, wherein $m$ equals $2n$.
28. The improvement of claim 14, wherein $m$ equals $2n$.
29. The improvement of claim 15, wherein $m$ equals $2n$.
30. The improvement of claim 16, wherein $m$ equals $2n$.
31. The improvement of claim 17, wherein $m$ equals $2n$.

32. The improvement of claim 18, wherein $m$ equals $2n$.

33. The improvement of claim 2, wherein $m$ equals eight and $n$ equals four.

34. The improvement of claim 3, wherein $m$ equals eight and $n$ equals four.

35. The improvement of claim 4, wherein $m$ equals eight and $n$ equals four.

36. The improvement of claim 6, wherein $m$ equals eight and $n$ equals four.

37. The improvement of claim 11, wherein $m$ equals eight and $n$ equals four.

38. The improvement of claim 12, wherein $m$ equals eight and $n$ equals four.

39. The improvement of claim 13, wherein $m$ equals eight and $n$ equals four.

40. The improvement of claim 14, wherein $m$ equals eight and $n$ equals four.

41. The improvement of claim 15, wherein $m$ equals eight and $n$ equals four.

42. The improvement of claim 16, wherein $m$ equals eight and $n$ equals four.

43. The improvement of claim 17, wherein $m$ equals eight and $n$ equals four.

UNITED STATES PATENT OFFICE
CERTIFICATE OF CORRECTION

Patent No. 3,568,051        Dated     March 2, 1971

Inventor(s)    Joseph Vild

It is certified that error appears in the above-identified patent and that said Letters Patent are hereby corrected as shown below:

Col. 8, line 73, "is" should be--NOR--.
Col. 9, line 29, after "65a" the following line was omitted:
 to trigger it and hence to actuate the marking device 30a--
Col. 9, line 54, "a" was omitted before 22-1/2.

CLAIMS:
Col. 9, line 70 "n" was omitted before "rotatable".
Col. 10, line 3, "of" should be deleted.
        line 6, "of" should be deleted.
Col. 11, line 10, "8" should be--1--.
Col. 12, line 24, "360/n°" should be--360/m°--/
Col. 13, line 41, "m" should be--n--.
Col. 13, line 44, after "n" insert--signal--.
Col 14, line 27, "axis" should be--axes--.
Col. 14, line 41, "n" first occurrence should be --2n--.
Col. 14, line 45, "provided" should be--provide--.
Col. 14, line 45, "n" should be --2n--.

Signed and sealed this 10th day of August 1971.

(SEAL)
Attest:

EDWARD M. FLETCHER, JR.      WILLIAM E. SCHUYLER, JR.
Attesting Officer              Commissioner of Patents